(12) United States Patent
Birinov et al.

(10) Patent No.: US 7,853,093 B2
(45) Date of Patent: Dec. 14, 2010

(54) SYSTEM, MEDIUM, AND METHOD ENCODING/DECODING A COLOR IMAGE USING INTER-COLOR-COMPONENT PREDICTION

(75) Inventors: Dmitri Birinov, Yongin-si (KR); Hyun Mun Kim, Seongnam-si (KR); Daesung Cho, Seoul (KR); Wooshik Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1160 days.

(21) Appl. No.: 11/486,150

(22) Filed: Jul. 14, 2006

(65) Prior Publication Data
US 2007/0019872 A1      Jan. 25, 2007

(30) Foreign Application Priority Data
Jul. 15, 2005    (KR) ............... 10-2005-0064503

(51) Int. Cl.
   *G06K 9/46*         (2006.01)
(52) U.S. Cl. .................. 382/248; 382/236
(58) Field of Classification Search ............... 382/100, 382/162, 163, 164, 165, 166, 167, 168, 171, 382/173, 232, 233, 234, 235, 236, 237, 238, 382/239, 240, 244, 245, 246, 247, 248, 249, 382/250, 251, 252, 253, 254, 266, 276, 277; 345/418, 426, 581, 589, 593, 594, 596, 597, 345/603, 604; 348/32, 34, 571, 608
See application file for complete search history.

(56) References Cited

U.S. PATENT DOCUMENTS 5,223,926 A * 6/1993 Stone et al. ............ 375/240.01
5,293,434 A * 3/1994 Feig et al. .................. 382/234
5,339,164 A * 8/1994 Lim ....................... 358/426.02

(Continued)

FOREIGN PATENT DOCUMENTS

EP         1 538 844         6/2005

(Continued)

OTHER PUBLICATIONS

PCT International Search Report, dated Oct. 30, 2006, and issued in corresponding Korean Patent Application No. PCT/KR2006/002789.

*Primary Examiner*—Andrew W Johns
*Assistant Examiner*—Tahmina Ansari
(74) *Attorney, Agent, or Firm*—Staas & Halsey LLP

(57) ABSTRACT

A color image encoding and/or decoding system, medium, and method using inter-color-component prediction in a frequency domain. To encode an original image, including at least two or more image components, frequency domain transform may be performed with of each component of a color image, color component transform of the frequency domain transform coefficients, in frequency domain, may be performed based on the relationship between transform coefficients of the color image components in order to remove redundant information between color components, performing, and entropy encoding the removed redundant information data. According to the method, medium, and system, a color image or video data can be directly compressed effectively without a conventional color transform process. Furthermore, by using the relationship between image components, redundant information between color components varying with respect to the encoding mode may be removed so that the encoding efficiency can be enhanced.

25 Claims, 12 Drawing Sheets

U.S. PATENT DOCUMENTS

| | | | |
|---|---|---|---|
| 5,379,356 A * | 1/1995 | Purcell et al. | 382/233 |
| 5,790,712 A * | 8/1998 | Fandrianto et al. | 382/276 |
| 6,353,685 B1 * | 3/2002 | Wu et al. | 382/250 |
| 2003/0112863 A1 | 6/2003 | Demos | |
| 2005/0111741 A1 * | 5/2005 | Kim et al. | 382/232 |
| 2005/0259730 A1 * | 11/2005 | Sun | 375/240.03 |
| 2007/0014478 A1 * | 1/2007 | Birinov et al. | 382/236 |

FOREIGN PATENT DOCUMENTS

| | | |
|---|---|---|
| EP | 1 478 189 | 11/2005 |

* cited by examiner

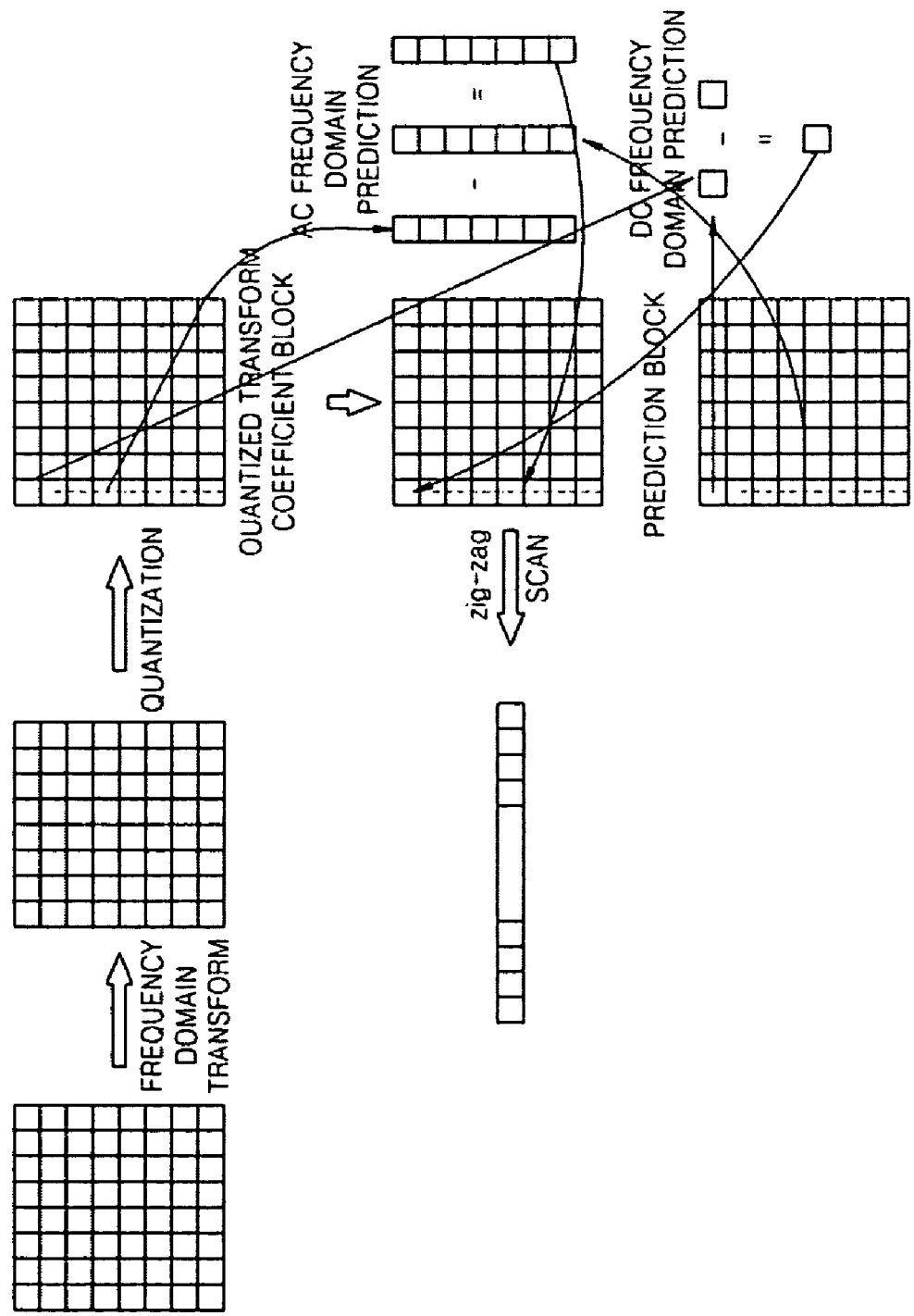

SYSTEM, MEDIUM, AND METHOD ENCODING/DECODING A COLOR IMAGE USING INTER-COLOR-COMPONENT PREDICTION

CROSS-REFERENCE TO RELATED APPLICATIONS

This application claims the priority benefit of Korean Patent Application No. 10-2005-0064503, filed on Jul. 15, 2005, in the Korean Intellectual Property Office, the disclosure of which is incorporated herein in its entirety by reference.

BACKGROUND OF THE INVENTION

1. Field of the Invention

Embodiments of the present invention relate at least to an encoding and/or decoding of a color image and video, and more particularly, to a color image encoding and/or decoding method, medium, and system using inter-color-component prediction in the frequency domain.

2. Description of the Related Art

In the Society of Motion Picture and Television Engineers (SMPTE) Standard for Television, a VC-1 Compressed Video Bitstream Format and Decoding Process (VC-1) has recently been undergoing standardization. Here, a color image format such as R-G-B and X-Y-Z may be converted into an image format appropriate to compression, such as Y-Cr-Cb, in order to increase the compression ratio. However, when conversion to Y-Cr-Cb is performed, the quality of an image is lowered.

In addition, when a Y-Cr-Cb image is compressed, the magnitudes of the Cr and Cb components are typcially reduced approximately four times and then encoded. Accordingly, when the Y-Cr-Cb image is encoded, it is difficult to reproduce a high quality image close to the original image quality.

As another problem, in order to reduce this conversion loss of the Y-Cr-Cb, if each of the R-G-B color components is encoded independently in the conventional Y-Cr-Cb encoder, any relationship remaining between the R-G-B components is not used, further lowering encoding efficiency.

SUMMARY OF THE INVENTION

Accordingly, embodiments of the present invention provide a color image and video encoding and/or decoding system, medium, and method using inter-color-component prediction in the frequency domain. In order to effectively directly compress a color image or video data without the conventional color conversion process, the relationship between image components is used, thereby reducing redundancy between color components enhancing the encoding efficiency and removing redundant information between respective color components varying with respect to the encoding mode.

Additional aspects and/or advantages of the invention will be set forth in part in the description which follows and, in part, will be apparent from the description, or may be learned by practice of the invention.

To achieve the above and/or other aspects and advantages, embodiments of the present invention include an encoding method using inter-component prediction in a frequency domain to encode an image having at least two image components, the method including performing a frequency domain transform of image components of the image, generating frequency domain transform coefficients in the frequency domain, performing component transform of the generated frequency domain transform coefficients in the frequency domain based on a relationship between transform coefficients of the image components to remove redundant information between the image components, and entropy encoding resultant redundant information removed data.

The performing of the frequency domain transform of the image components may further include quantizing the generated frequency domain transform coefficients, and performing DC/AC coefficient prediction of the quantized frequency domain transform coefficients, wherein the performing of the component transform of the generated frequency domain transform coefficients in the frequency domain, in order to remove the redundant information between the image components, uses a result of the DC/AC coefficient prediction for the component transform.

The performing of the frequency domain transform of the image components may still further include quantizing the generated frequency domain transform coefficients, and wherein the performing of the component transform of the generated frequency domain transform coefficients in the frequency domain includes performing the component transform of the generated frequency domain transform coefficients in the frequency domain by using the quantized frequency domain transform coefficients, to remove the redundant information between the image components, and performing DC/AC coefficient prediction of the generated frequency domain transform coefficients after the redundant information has been removed.

The performing of the component transform of the frequency domain transform coefficients in the frequency domain may further include quantizing the frequency domain transform coefficients in which the redundant information has been removed, and performing DC/AC coefficient prediction of the frequency domain transform coefficients after the redundant information has been removed.

The method may still further include obtaining a prediction image by estimating a motion, in units of blocks of a predetermined size, using a current image and a previous image, and generating residue image data corresponding to a difference between the prediction image and the current image, if an encoding mode is detected to be an inter prediction mode, and removing data redundancy between components of the generated residue image data to generate the resultant redundant information removed data for the entropy encoding of the resultant redundant information removed data.

The method may also include transforming the resultant redundant information removed data, into the frequency domain, and quantizing the frequency domain transformed resultant redundant information removed data, wherein, in the entropy encoding, the quantized frequency domain transformed resultant redundant information removed data is entropy encoded.

The removing of the data redundancy between the image components may include transforming the generated residue image data to the frequency domain, generating residue coefficients, performing component transform in the frequency domain of residue coefficients that are transformed into the frequency domain, in order to remove redundant information between components from the residue image data, and quantizing the redundant information removed residue image data, wherein, in the entropy encoding, the quantized redundant information removed residue image data is entropy encoded.

The removing of the data redundancy between components may include transforming the generated residue image data to the frequency domain, quantizing the transformed residue image data with residue coefficients, and performing component transform in the frequency domain of the quantized residue coefficients, in order to remove redundant information between components from the residue image data, wherein, in the entropy encoding, a resultant redundant information removed residue image data is entropy encoded.

To achieve the above and/or other aspects and advantages, embodiments of the present invention include an image and video encoding system using inter-component prediction in a frequency domain in order to encode an image having at least two image components, the system including a frequency domain transform unit to performing frequency domain transform of components of the image, generating frequency domain transform coefficients in the frequency domain, a frequency domain transform coefficient prediction unit to perform component transform of the generated frequency domain transform coefficients in the frequency domain based on a relationship between transform coefficients of the image components, to remove redundant information between image components, and an entropy encoding unit to entropy encode a result of the frequency domain transform coefficient prediction unit where the redundant information is removed between transform coefficients.

The system may include a quantization unit to quantize the generated frequency domain transform coefficients, and a DC/AC coefficient prediction unit to perform DC/AC coefficient prediction of the quantized frequency domain transform coefficients, wherein, the frequency domain transform coefficient prediction unit performs the component transform of the frequency domain transform coefficients, based on a result of the DC/AC coefficient prediction unit, to generate the result of the frequency domain transform coefficient prediction unit to be entropy encoded by the entropy encoding unit.

The system may further include a residue generation unit to generate residue image data corresponding to a difference between a current image and a prediction image obtained by estimating a motion, in units of blocks of a predetermined size, using the current image and a previous image, if a detected encoding mode is an inter prediction mode, and a residue prediction unit to remove data redundancy between components of the generated residue image data, and to generate the result of the frequency domain transform coefficient prediction unit to be entropy encoded by the entropy encoding unit.

They system still may further include an inter frequency domain transform unit to transform resultant redundant information removed residue image data, in which the redundancy is removed in the residue prediction unit, into the frequency domain, and an inter quantization unit to quantize the transformed redundant information removed data into the frequency domain to generate the result of the frequency domain transform coefficient prediction unit used by the entropy encoding unit.

To achieve the above and/or other aspects and advantages, embodiments of the present invention include an image and video decoding method using inter-component compensation in a frequency domain in order to decode a bitstream obtained by compressing an original image having at least two image components, by using prediction between frequency domain components, the method including entropy decoding the bitstream to generate entropy decoded data, compensating frequency domain transform coefficients from the entropy decoded data by using an inter-component transform, and restoring an image, corresponding to the original image, by performing a frequency domain inverse transform of the compensated frequency domain transform coefficients.

The method may further include performing DC/AC coefficient compensation of the compensated frequency domain transform coefficients, as DC/AC coefficient compensated data, and inverse quantizing the DC/AC coefficient compensated data, wherein, in the restoring of the image, the image is restored by performing frequency domain inverse transform of the inverse quantized DC/AC coefficient compensated data.

The compensating of the frequency domain transform coefficients may include performing DC/AC coefficient compensation of the entropy decoded data, compensating the frequency domain transform coefficients by using an inter-component transform using resultant DC/AC coefficient compensated data, and inverse quantizing the compensated frequency domain transform coefficients, and restoring the image by performing the frequency domain inverse transform with resultant inverse quantized compensated frequency domain transform coefficients.

The compensating of the frequency domain transform coefficients may include performing DC/AC coefficient compensation of the entropy decoded data, inverse quantizing the DC/AC coefficient compensated entropy decoded data, and compensating the frequency domain transform coefficients by using inter-component transform based on the inverse quantized DC/AC coefficient compensated entropy decoded data, and restoring the image by performing the frequency domain inverse transform with the compensated frequency domain transform coefficients.

The method may include inverse quantizing the entropy decoded data if a detected decoding mode is an inter prediction mode, performing frequency domain inverse transform of the inverse quantized entropy decoded data, compensating generated component residue coefficients, by using a relationship between the frequency domain transform coefficients, in order to restore residue image data, based on the frequency domain inverse transformed inverse quantized entropy decoded data, and restoring the image by adding the restored residue image data and a motion predicted image.

In addition, the method may include inverse quantizing the entropy decoded data if a detected decoding mode is an inter prediction mode, compensating component residue coefficients in the frequency domain, based on a relationship between the frequency domain transform coefficients, to restore residue image data based on the inverse quantized entropy decoded data, and restoring the image by adding the restored residue image data and a motion predicted image.

The method may still further include compensating component residue coefficients in the frequency domain, based on a relationship between the frequency domain transform coefficients if the decoding mode is an inter prediction mode, with the entropy decoded data, inverse quantizing the compensated component residue coefficients in the frequency domain, restoring residue image data by performing a frequency domain inverse transform of the inverse quantized compensated component residue coefficients, and restoring the image by adding the restored residue image data and a motion predicted image.

To achieve the above and/or other aspects and advantages, embodiments of the present invention include an image and video decoding system using inter-component compensation in a frequency domain in order to decode a bitstream obtained by compressing an original image having at least two image components, by using prediction between frequency domain components, the system including an entropy decoding unit to entropy decode the bitstream to generate entropy decoded data, an inverse frequency domain transform coefficient prediction unit to compensate frequency domain transform coefficients from the entropy decoded data by using an inter-component transform, and an inverse frequency domain transform unit to restore an image, corresponding to the original image, by performing a frequency domain inverse transform of the compensated frequency domain transform coefficients.

The system may include a DC/AC coefficient compensation unit to perform DC/AC coefficient compensation of the compensated frequency domain transform coefficients, as DC/AC coefficient compensated data, and an inverse quantization unit to inverse quantize the DC/AC coefficient compensated data, wherein the inverse frequency domain transform unit restores the image by performing a frequency domain inverse transform of the inverse quantized DC/AC coefficient compensated data.

In addition, the system may include a residue compensation unit to compensate component residue coefficients with respect to the entropy decoded data, by using a relationship of the transform coefficients, in order to restore residue image data, if a decoding mode is detected to be an inter prediction mode, and a time prediction decoding unit to restore the image by adding the restored residue image data and a motion predicted image.

Still further, the system may include an inter inverse quantization unit to inverse quantize the entropy decoded data, if a decoding mode is detected to be an inter prediction mode, and an inter inverse frequency domain transform unit to perform frequency domain inverse transform of the inverse quantized entropy decoded data, wherein the residue compensation unit compensates the component residue coefficients, based on the frequency domain inverse transformed inverse quantized entropy decoded data, in order to restore the residue image data.

To achieve the above and/or other aspects and advantages, embodiments of the present invention include at least one medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates a process of predicting DC/AC coefficients according to an embodiment of the present invention;

DETAILED DESCRIPTION OF THE PREFERRED EMBODIMENTS

Figure 1:
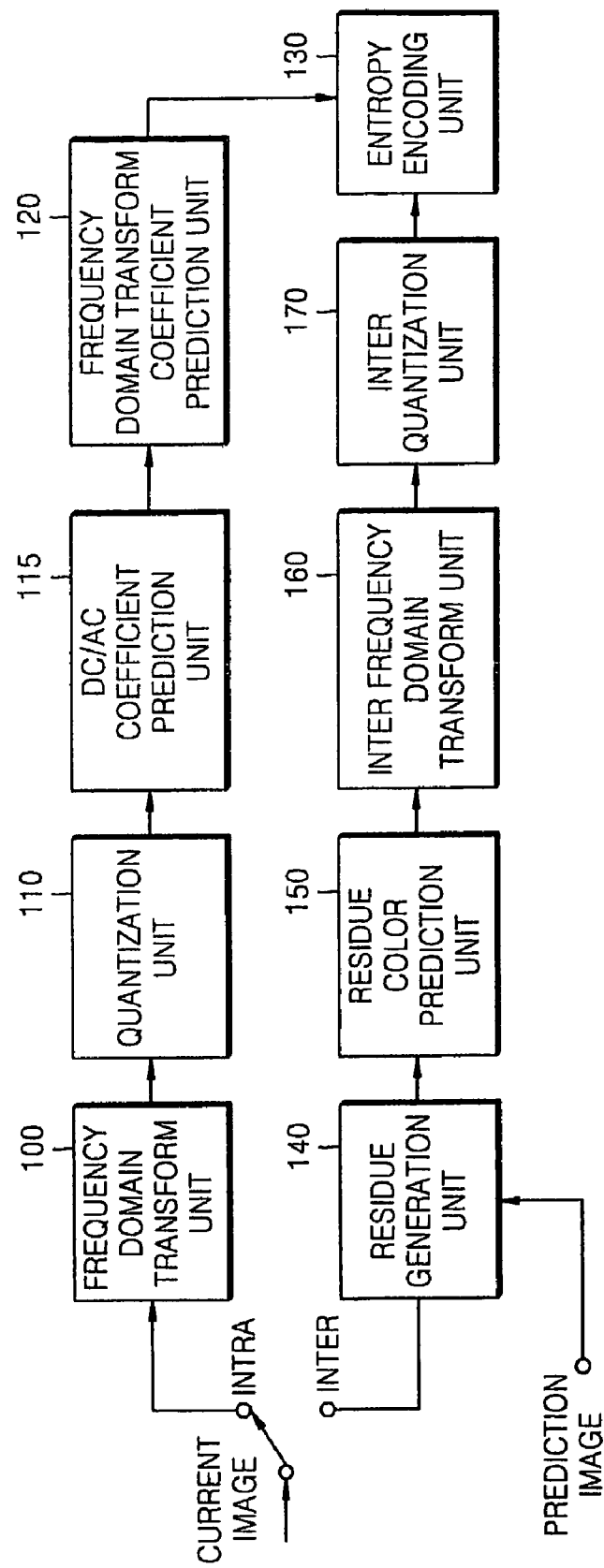
FIG. 1 illustrates a color image and video system/apparatus using inter-color-component prediction in the frequency domain, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a color image and video system/apparatus using inter-color-component prediction in the frequency domain, according to an embodiment of the present invention. The system may include a frequency domain transform unit 100, a frequency domain transform coefficient prediction unit 120, and an entropy encoding unit 130, for example. In an embodiment, the system may further include a quantization unit 110, a DC/AC coefficient prediction unit 115, a residue generation unit 140, a residue color prediction unit 150, an inter frequency domain transform unit 160, and an inter quantization unit 170, for example.

The frequency domain transform unit 100 performs a frequency domain transform of each component of a color image. The quantization unit 110 quantizes the frequency domain transform coefficients generated in the frequency domain transform unit 100. The DC/AC coefficient prediction unit 115 performs DC/AC coefficient prediction of the quantized frequency domain transform coefficients. By using the relationship between the transform coefficients of the color image components, the frequency domain transform coefficient prediction unit 120 removes redundant information between the color components, performing a color component transform of the DC/AC coefficient predicted data, in the frequency domain.

Here, according to an embodiment of the present invention, in an inter prediction mode, the residue generation unit 140 generates a residue corresponding to the differences between a current image and a prediction image obtained by motion estimation, in units of blocks of a predetermined size, by using a current image and a previous image. With the generated residue image data, the residue color prediction unit 150 may remove data redundancy between color components. The inter frequency domain transform unit 160 may transform the redundancy removed data, e.g., removed in the residue color prediction unit 150, into the frequency domain, the inter quantization unit 170 may quantize the frequency domain data transformed into frequency domain, and the entropy encoding unit 130 may entropy encode the resultant redundancy removed data or the quantized frequency domain data, e.g., quantized in the inter quantization unit 170.

In embodiments of the present invention, an original color image may include at least two color image components and may be any one of R-G-B, Y-Cb-Cr, and X-Y-Z format images, for example, noting that alternative embodiments are equally available.

In addition, according to embodiments of the present invention, the frequency domain transform coefficient prediction unit 120 may be disposed between the frequency domain transform unit 100 and the quantization unit 100, or between the quantization unit 110 and the DC/AC coefficient prediction unit 115, as an example.

Similarly, the residue color prediction unit 180 may be disposed between the inter frequency domain transform unit 160 and the inter quantization unit 17, or disposed after the inter quantization unit 170, also as an example.

Figure 2:
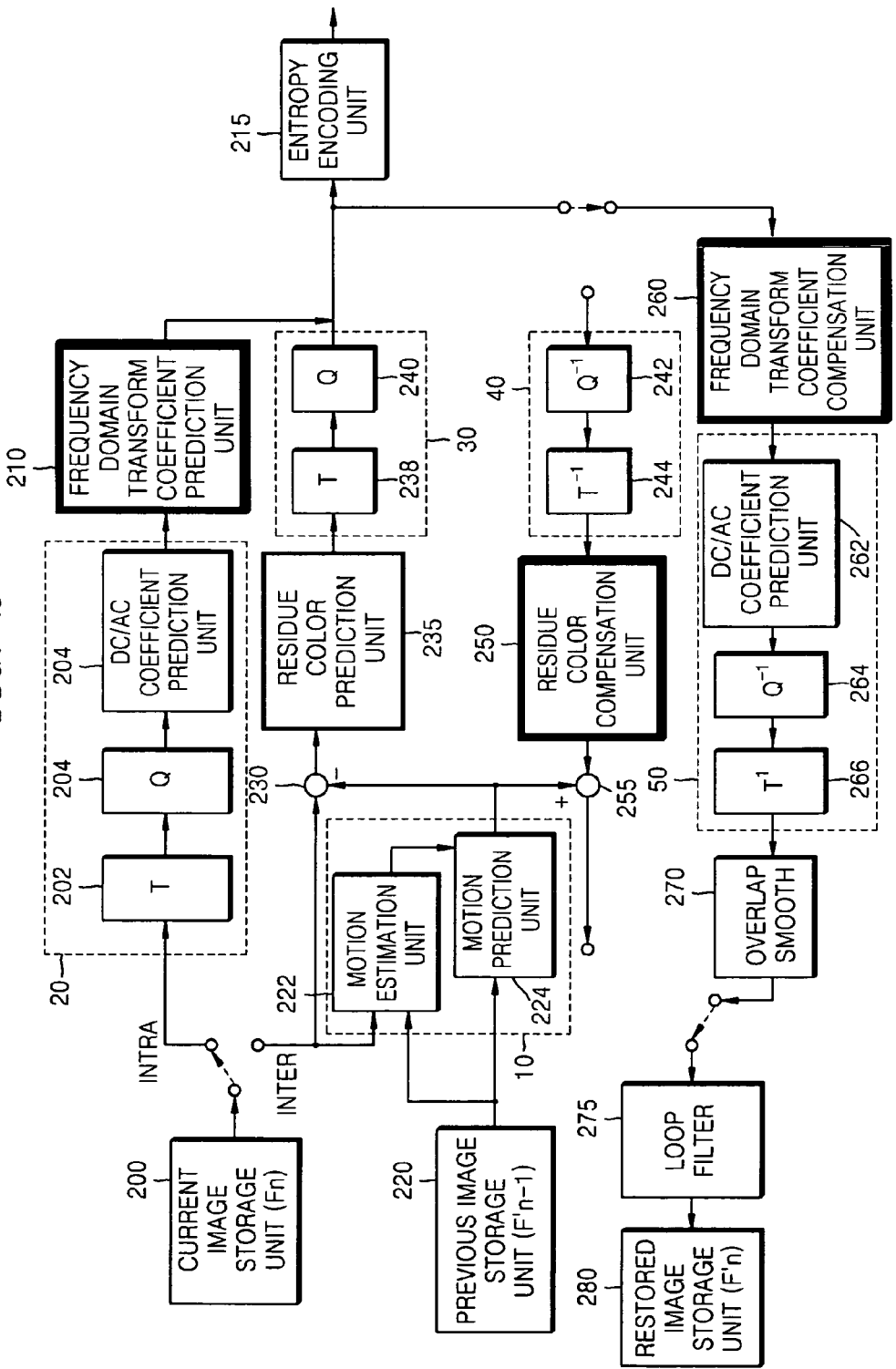
FIG. 2 illustrates a color image and video system/apparatus using inter-color-component prediction in the frequency domain, according to another embodiment of the present invention.

FIG. 2 illustrates a color image and video system/apparatus using inter-color-component prediction in the frequency domain, according to an embodiment of the present invention. According to an embodiment, the system of FIG. 2 adds a frequency domain transform coefficient prediction unit 210, a residue color prediction unit 235, a residue color compensation unit 250, and a frequency domain transform coefficient compensation unit 260, to a conventional encoding system, such as the VC-1 video compression standardization technology ("Proposed SMPTE Standard for Television: VC-1 Compressed Video Bitstream Format and Decoding Process", SMPTE42M, FCD, 2005) of the SMPTE that has been undergoing standardization recently. Here, a color image including G, R, and B components are directly encoded, for example.

The system may include a current image storage unit (Fn) 200, a previous image storage unit (F'n-1) 220, a motion prediction image generation unit 10, an intra compression encoding unit 20, an inter compression encoding unit 30, an intra inverse compression encoding unit 50, an inter inverse compression encoding unit 40, a residue generation unit 235, an original image generation unit 255, an entropy encoding unit 215, a loop filter 275, an overlap smooth unit 270, a frequency domain transform coefficient prediction unit 210, a residue color prediction unit 235, a frequency domain transform coefficient compensation unit 260, and a residue color compensation unit 250, for example.

The current image storage unit 200 may receive and store an original color image, and the previous image storage unit 220 may store a decoded previous color image with three components, for example.

In order to increase the encoding efficiency, the encoding system uses an inter prediction method in which time prediction is performed by estimating a motion, in units of blocks, between a previous frame and a current frame, and an intra prediction method in which transform coefficient prediction is used in a spatially adjacent block in a current frame. The motion prediction image generation unit 10 may include a motion estimation unit 222 and a motion prediction unit 224, for example. The motion estimation unit 222 estimates a motion, in units of blocks, between a previous frame and a current frame, and the motion prediction unit 224 outputs a block corresponding to a motion vector generated from the motion estimation unit 222.

The residue generation unit 230 generates a residue corresponding to a difference of a block of the image of the motion prediction image generation unit 10 and a corresponding block of a current frame, and the residue color prediction unit 235 removes redundant information between color components, e.g., by color transforming the residue image generated in the residue generation unit 230.

The inter compression encoding unit 30 encodes data generated in the residue color prediction unit 235 through compression, and may include a frequency domain transform unit 238 and a quantization unit 240, for example.

The frequency domain transform unit 238 generates transform coefficients from the color components generated in the residue color prediction unit 235, by using a transform, such as discrete cosine transform (DCT), for example, while the quantization unit 240 quantizes the transform coefficients, generated in the frequency domain transform unit 238, for example.

The intra compression encoding unit 20 compresses the original color image, e.g., stored in the current image storage unit 200, by an intra prediction method, and may include a frequency domain transform unit 202, a quantization unit 204, and a DC/AC coefficient prediction unit 206, for example.

As another example, the frequency domain transform unit 202 obtains transform coefficients by using a transform such as the DCT, and the quantization unit 204 quantizes the transform coefficients, e.g., generated in the frequency domain transform unit 202. The DC/AC coefficient prediction unit 206 performs prediction, by estimating a prediction direction from a transform coefficient spatially close to a transform coefficient block of the current frame. The frequency domain transform coefficient prediction unit 210 removes redundant information between transform coefficients corresponding to respective components, and the entropy encoding unit 215 generates a resultant bitstream through entropy encoding.

The inter inverse compression unit 40 may include an inverse frequency domain transform unit 244 and an inverse quantization unit 242, for example, and the inverse quantization unit 242 inverse quantizes quantized data. The inverse frequency domain transform unit 244 restores residue data by performing inverse frequency domain transform of the inverse quantized data. The residue color compensation unit 250 performs a process to compensate the residue data in frequency domain through inverse color transform, with a result being added through the original image generation unit 255 to the block value predicted through the inter prediction method used in the motion estimation unit 222 and the motion prediction unit 224.

Here, the loop filter 275 generates an image F'n to be restored in a decoding system through the loop filter 275 reducing a block effect, and the frequency domain transform coefficient compensation unit 260 restores transform coefficient data.

The intra inverse compression encoding unit 50 may include an inverse frequency domain transform unit 266, an inverse quantization unit 264, and a DC/AC coefficient prediction unit 262. The DC/AC coefficient prediction unit 262 compensates the transform coefficients, e.g., generated in the frequency domain transform coefficient compensation unit 260. The inverse quantization unit 264 inverse quantizes quantized data, with the inverse frequency domain transform unit 266 restoring residue data by performing inverse frequency domain transform of the inverse quantized data. The overlap smooth unit 270 then performs an overlap transform of the restored image data in order to remove a block effect.

Figure 3:
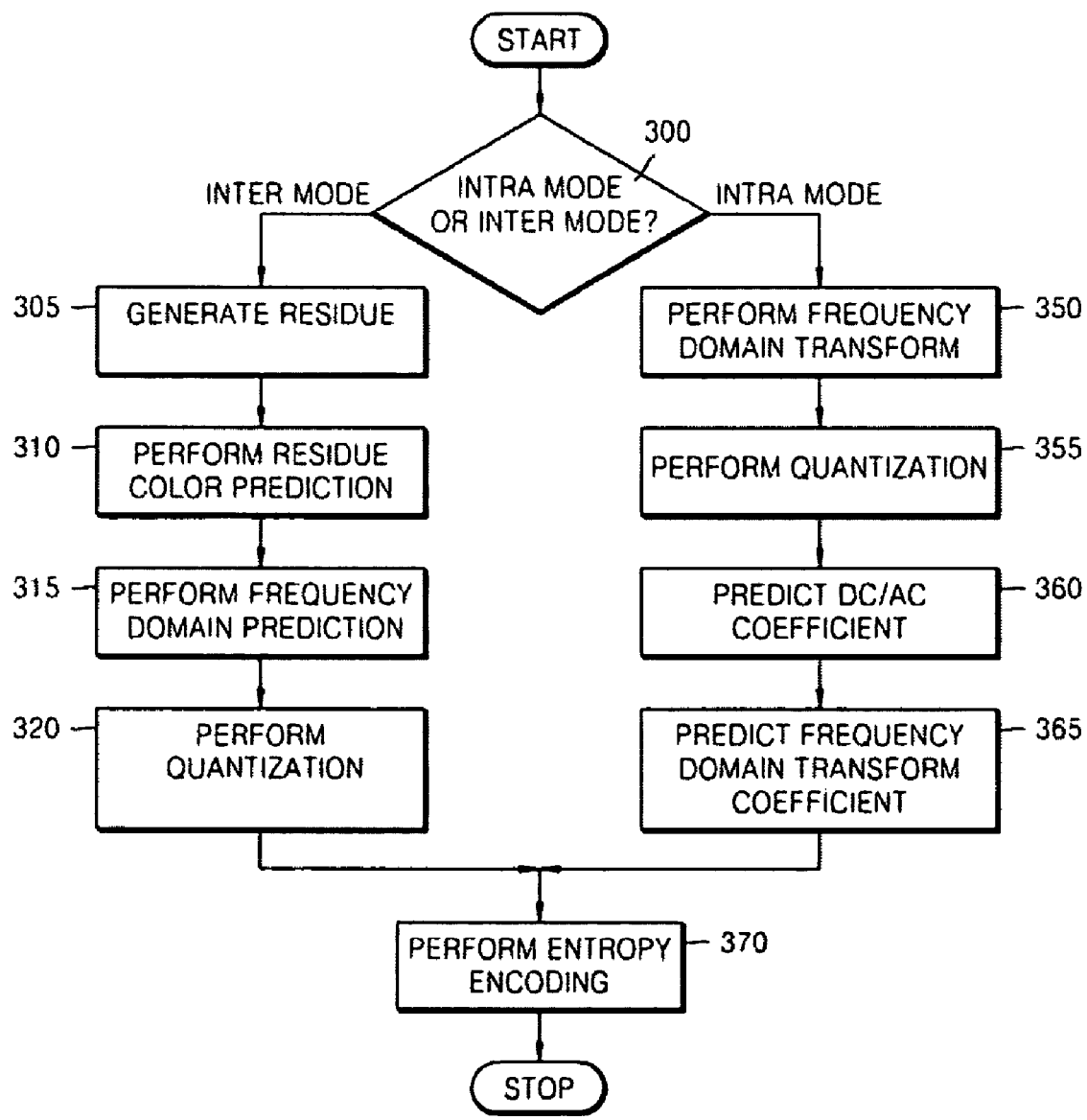
FIG. 3 illustrates an encoding process of a color image and video data using inter-color-component prediction in the frequency domain, according to an embodiment of the present invention.

FIG. 3 illustrates an encoding process of a color image and video data using inter-color-component prediction in the frequency domain, according to an embodiment of the present invention.

First, for example, it may be determined whether the encoding mode is intra prediction mode or inter prediction mode, in operation 300. If it is the inter prediction mode, a motion is estimated, in units of blocks of a predetermined size, to obtain a prediction image, e.g., by using a current image and a previous image, and a residue corresponding to the difference of the prediction image and the current image may be generated, in operation 305. Data redundancy between color components of the generated residue image data may be then be removed, in operation 310. The data in which the data redundancy between color components is removed is transformed into the frequency domain, in operation 315, the data transformed into frequency domain may be quantized, in operation 320, and then the quantized data may be entropy encoded, in operation 370.

An inter prediction mode will now be explained in more detail. In the inter prediction mode, e.g., first, in the G component (G plane), residue information of the G value may be obtained by subtracting a value predicted by using a temporally adjacent image value, from the G component in the same manner as in a conventional encoding system. This residue value may be expressed according to the following Equation 1.

$$\Delta G = G - Gp \qquad \text{Equation 1}$$

For the R and B components, motion prediction 120 may be performed in each color plane in a similar manner as for the G component, for example. Residues obtained from the predictions may further be expressed according to the following Equations 2 and 3

$$\Delta R = R - Rp$$

$$\Delta B = B - Bp \qquad \text{Equations 2 and 3}$$

Here, Rp and Bp are obtained through predictions with temporally adjacent image values.

In order to remove redundant information among respective color component residues, residue color prediction may be performed. Here, loss should not occur when residue transform is performed. For example, there is a simple method of prediction using $\Delta G$ as a predictor, where prediction is performed by subtracting $\Delta R$ and $\Delta B$ from $\Delta G$. This method can be expressed as a prediction expression and a compensation expression as the following Equation 4.

$$\begin{bmatrix} \Delta^2 R \\ \Delta^2 G \\ \Delta^2 B \end{bmatrix} = \begin{bmatrix} 1 & -1 & 0 \\ 0 & 1 & 0 \\ 0 & -1 & 1 \end{bmatrix} \begin{bmatrix} \Delta R \\ \Delta G \\ \Delta B \end{bmatrix} \qquad \text{Equation 4}$$

$$\begin{bmatrix} \Delta R \\ \Delta G \\ \Delta B \end{bmatrix} = \begin{bmatrix} 1 & 1 & 0 \\ 0 & 1 & 0 \\ 0 & 1 & 1 \end{bmatrix} \begin{bmatrix} \Delta^2 R \\ \Delta^2 G \\ \Delta^2 B \end{bmatrix}$$

Here, $\Delta^2 R$, $\Delta^2 G$ and $\Delta^2 B$ are predicted residue signals. In order to efficiently remove redundancy between respective components, a color prediction equation may be applied, with the color prediction equation taking into considering the relationship between respective color components. For example, The YCoCg transform equation and inverse transform equation ("YCoCg-R: A Color Space with RGB Reversibility and Low Dynamic Range", ISO/IEC JTC1/SC29/WG11 and ITU-T SG16 Q. 6 Document JVT-I014r3, San Diego, September, 2003) may be express according to the following Equation 5.

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \qquad \text{Equation 5}$$

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

When the YCoCg transform equation and inverse transform equation are applied to residue transform and inverse transform, the following Equation 6 can be obtained.

$$\begin{bmatrix} \Delta^2 R \\ \Delta^2 G \\ \Delta^2 B \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta R \\ \Delta G \\ \Delta B \end{bmatrix} \qquad \text{Equation 6}$$

$$\begin{bmatrix} \Delta R \\ \Delta G \\ \Delta B \end{bmatrix} = \begin{bmatrix} 1 & 1 & -1 \\ 1 & 0 & 1 \\ 1 & -1 & -1 \end{bmatrix} \begin{bmatrix} \Delta^2 R \\ \Delta^2 G \\ \Delta^2 B \end{bmatrix}$$

Further, YCoCg-R ("YCoCg-R: A Color Space with RGB Reversibility and Low Dynamic Range", ISO/IEC JTC1/SC29/WG11 and ITU-T SG16 Q.6 Document JVT-I014r3, San Diego, September, 2003) may be obtained by improving the YCoCg transform using a lifting method, with the transform and inverse transform equations being represented by the following Equation 7.

$$Co = R - B \qquad t = Y - (Cg >> 1) \qquad \text{Equation 7}$$

$$t = B + (Co >> 1) \qquad G = Cg + t$$

$$Cg = G - t \qquad B = t - (Co >> 1)$$

$$Y = t + (Cg >> 1) \qquad R = B + Co$$

These transform equations may also be applied to a residue transform expression in a similar manner.

In the intra prediction mode, the frequency domain transform of each component of a color image may be performed, in operation 350. The frequency domain transform coefficients generated in the operation 350, for example, may be, quantized in operation 355. DC/AC coefficient prediction of the quantized frequency domain transform coefficients may then be performed, in operation 360. With the DC/AC coefficient predicted result, color component transform, in the frequency domain, of the frequency domain transform coefficients may be performed by using the relationship between the transform coefficients of the color image components. By doing so, redundant information between color components may be removed, in operation 365. The data in which redundancy between the transform coefficients is removed may then be entropy encoded, in operation 370.

Figure 8:
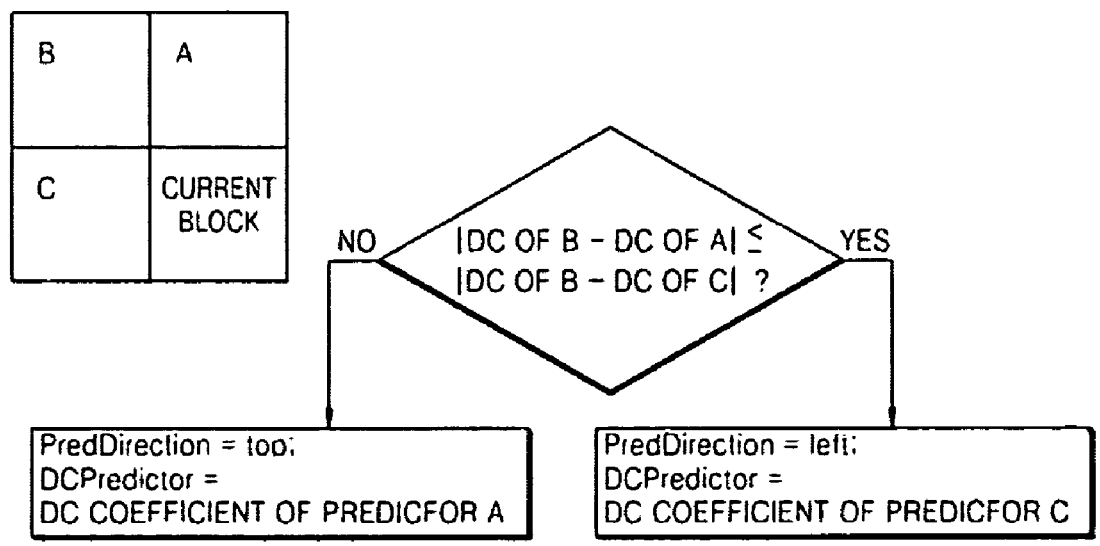
FIG. 8 illustrates a process for determining a spatial prediction direction according to an embodiment of the present invention.

The intra prediction mode will now be explained in more detail. In the intra prediction mode, the pixel values of respective color components of the original image may be transformed, in units of blocks, in a frequency domain transform unit. Then, spatial information prediction processes, using coefficient information of blocks adjacent to a current block may be performed. For example, in the aforementioned VC-1 standard technology, and as further shown in FIG. 6, an 8×8 pixel block is frequency domain transformed, and then, DC frequency coefficient domain prediction and AC frequency coefficient domain prediction are sequentially performed. In the DC frequency coefficient domain prediction, two types of direction prediction are possible (Refer to FIG. 8). The prediction process is shown in detail in FIG. 6. As described above, a prediction coefficient block is obtained by estimating a prediction direction, and then, a frequency domain residue coefficient block is generated by subtracting the prediction coefficient block from the original coefficient block. This process is performed for each of the three components. Then, in order to increase the encoding efficiency, an inter-color-component frequency domain transform coefficient prediction process is performed to remove redundant information between the components. The frequency domain transform coefficient prediction process can be performed through a variety of methods, for example. Also, for the color component prediction, an adaptive method may be used where the prediction is performed by selecting one of a plurality of preset prediction methods.

For example, the residue coefficient blocks obtained in the transform coefficient prediction process may be zigzag scanned, as shown in FIG. 6, and the following Equation 8 can be applied.

$$[\Delta X1_0 \quad \Delta X1_1 \quad \Delta X1_2 \quad \cdots \quad \Delta X1_{63}];$$
$$[\Delta X2_0 \quad \Delta' X2_1 \quad \Delta X2_2 \quad \cdots \quad \Delta X2_{63}];$$
$$[\Delta X3_0 \quad \Delta X3_1 \quad \Delta X3_2 \quad \cdots \quad \Delta X3_{63}];$$

$$\begin{bmatrix} \Delta' X1_i \\ \Delta' X1_i \\ \Delta' X1_i \end{bmatrix} = \begin{bmatrix} 1 & -1 & 0 \\ 0 & 1 & 0 \\ 0 & -1 & 1 \end{bmatrix} \begin{bmatrix} \Delta X1_i \\ \Delta X1_i \\ \Delta X1_i \end{bmatrix}, \quad i = 0, \ldots 63;$$

Equation 8

Here, $\Delta X1_i$, $\Delta X2_i$, and $\Delta X3_i$ are residue transform coefficients of the three components, respectively, and $\Delta' X1_i$, $\Delta' X2_i$, and $\Delta' X3_i$ are residue coefficients between color components.

Again, the original image may be any one of R-G-B, Y-Cb-Cr, and X-Y-Z format images, for example. When the color image is expressed as an RGB signal, the above Equation 1 transforms into the following Equation 9.

$$\begin{bmatrix} \Delta' R1_i \\ \Delta' G1_i \\ \Delta' B1_i \end{bmatrix} = \begin{bmatrix} 1 & -1 & 0 \\ 0 & 1 & 0 \\ 0 & -1 & 1 \end{bmatrix} \begin{bmatrix} \Delta R1_i \\ \Delta G1_i \\ \Delta B1_i \end{bmatrix}, \quad i = 0, \ldots 63;$$

Equation 9

Meanwhile, the encoding process shown in FIG. 3 may have different performing sequences or may further include other operations. As only an example, when a quantization operation is added, such as in FIGS. 4A and 4B, there may be three encoding processes of FIG. 3 (operations 350 through 365), and FIGS. 4A and 4B with respect to performing sequences of the frequency domain transform coefficient prediction operation.

Figure 4A:
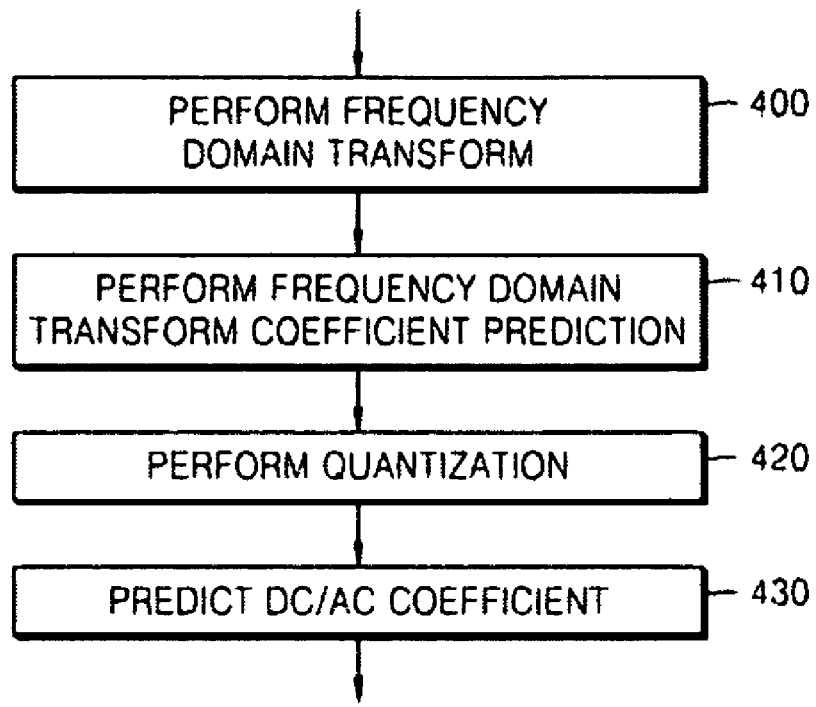
FIGS. 4A and 4B illustrate encoding processes, such as those of operations 350 through 365 of FIG. 3, but in different orders, according to an embodiment of the present invention.
Figure 4B:
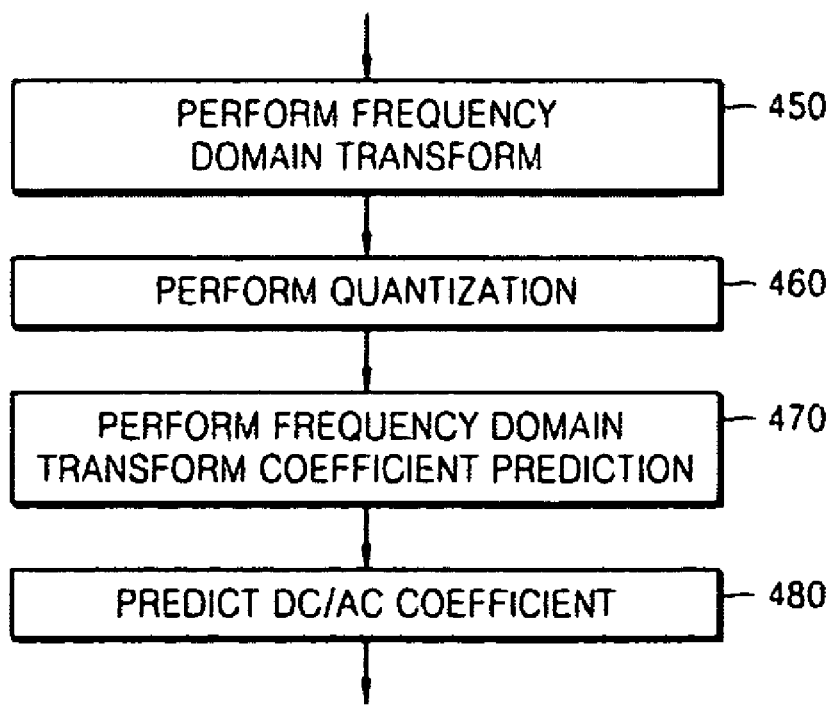

FIGS. 4A and 4B illustrate encoding processes, such as those of operations 350 through 365 in FIG. 3 but in different orders, according to an embodiment of the present invention. In the operations 350 through 365 of FIG. 3, the frequency domain transform coefficient prediction is performed after the frequency domain transform, while in the example embodiment of FIG. 4B the frequency domain transform coefficient prediction is performed between the quantization and the DC/AC coefficient prediction.

Referring to FIG. 4A, frequency domain transform of each component of the color image is performed, in operation 400, for example. With the frequency domain transformed data, color component transform in the frequency domain, of the frequency domain transform coefficients, can be performed by using the relationship between the transform coefficients of the color image components. By doing so, redundant information between color components can be removed, in operation 410. The frequency domain transform coefficients, having information redundancy removed, are quantized, in operation 420. Thereafter, DC/AC coefficient prediction is performed with the frequency domain transform coefficients, having the information redundancy removed, in operation 430.

Referring to FIG. 4B, frequency domain transform of each component of the color image may be performed, in operation 450. The frequency domain transform coefficients generated in the frequency domain transform can then be quantized, in operation 460. With the quantized transform coefficients, color component transform in the frequency domain, of the frequency domain transform coefficients, can be performed by using the relationship between the transform coefficients of the color image components. By doing so, redundant information between color components can then be removed, in operation 470. DC/AC coefficient prediction may be performed with the frequency domain transform coefficients, having the information redundancy removed, in operation 480.

Figure 5A:
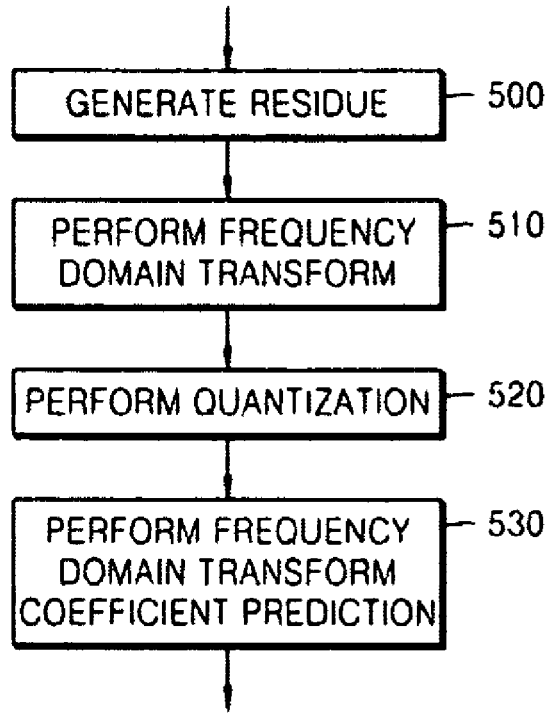
FIGS. 5A and 5B illustrate encoding processes, such as those of operations 305 through 320 of FIG. 3, but in different orders, according to an embodiment of the present invention.
Figure 5B:
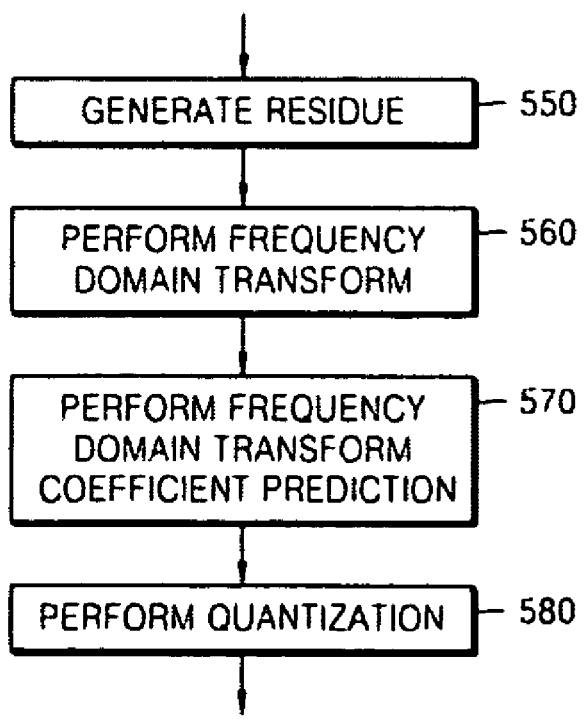
Figure 7:
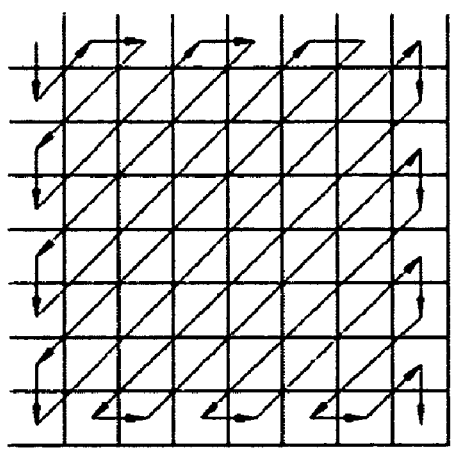
FIG. 7 illustrates a zigzag scan according to an embodiment of the present invention.

Likewise, potential encoding processes of the inter prediction mode, according to an embodiment of the present invention are shown in FIG. 3 (operations 305 through 320), and FIGS. 5A and 5B. Here, the operations 305 through 320 of FIG. 3 include residue generation in operation 305, residue color prediction in operation 310, frequency domain prediction in operation 315, and quantization in operation 320, and are performed in this order for encoding in the inter mode, according to an embodiment of the present invention.

Referring to FIG. 5A, in the inter prediction mode, a prediction image may be obtained by estimating a motion, in units of blocks of a predetermined size, using a current image and a previous image, and a residue corresponding to the prediction image and the current image may be generated, in operation 500. The generated residue image data may be transformed into frequency domain data, in operation 510. The residue data transformed, into the frequency domain data, may then be quantized, in operation 520. By using the relationship between the transform coefficients, color component transform in the frequency domain of the quantized residue coefficients may be performed so that redundant information between color components can be removed, in operation 530.

Referring to FIG. 5B, in the inter prediction mode, a prediction image may be obtained by estimating a motion, in units of blocks of a predetermined size, using a current image and a previous image, and a residue corresponding to the prediction image and the current image may be generated, in operation 550. The generated residue image data may then be transformed into frequency domain data, in operation 560. By using the relationship between the transform coefficients, color component transform may be performed in frequency domain with the residue coefficients, having been frequency domain transformed, so that redundant information between color components can be removed, in operation 570. The residue image data having the redundant information between the color components removed may then be quantized, in operation 580.

A color image system, medium, and method using inter-color-component prediction in the frequency domain for decoding, according to an embodiment of the present invention, will now be explained in greater detail.

Figure 9:
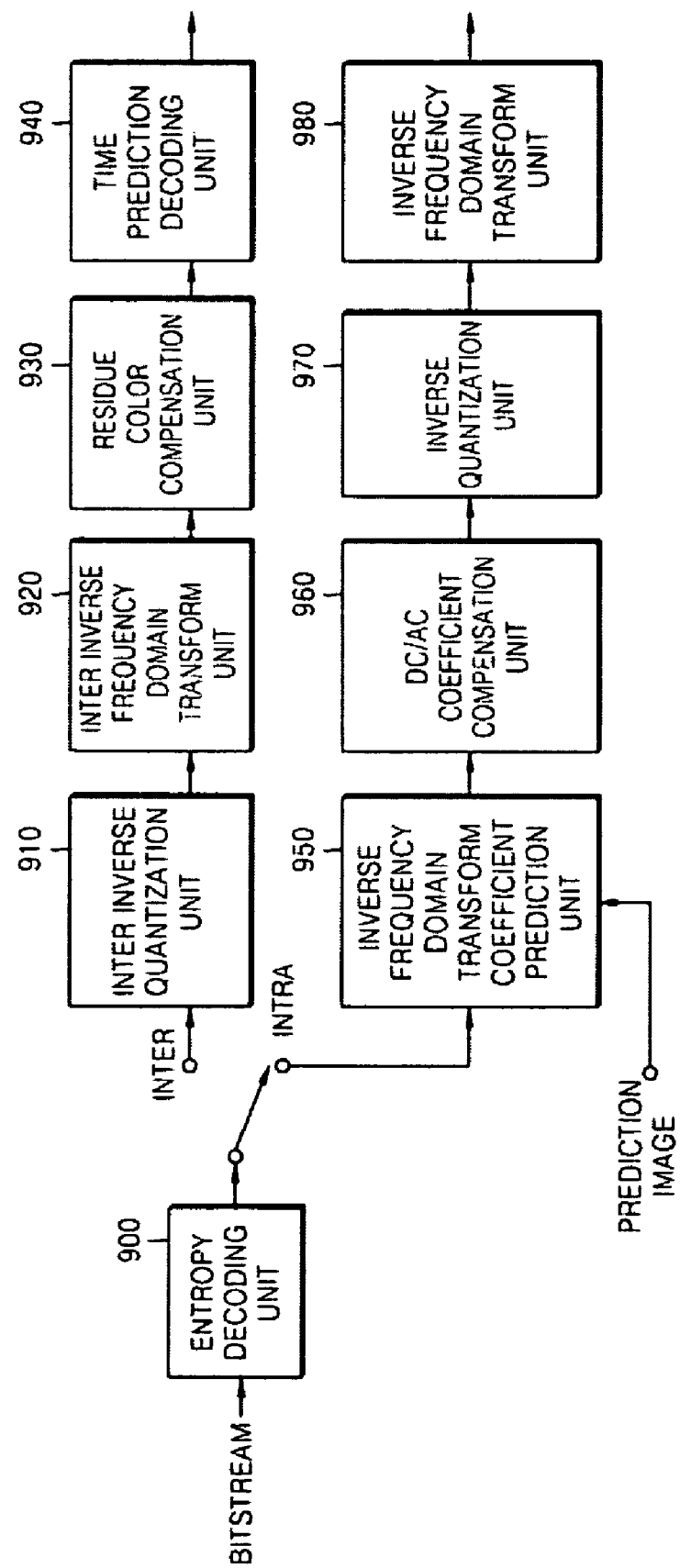
FIG. 9 illustrates a color image and video system/apparatus decoding a color image and video encoded by using inter-color-component prediction in the frequency domain, according to an embodiment of the present invention.

FIG. 9 illustrates a color image and video apparatus/system decoding a color image and video encoded by using inter-color-component prediction in the frequency domain, according to an embodiment of the present invention. The decoding system may include an entropy decoding unit 900, an inverse frequency domain transform coefficient prediction unit 950, and an inverse frequency domain transform unit 980, for example. The decoding system may further include a DC/AC coefficient compensation unit 960, an inverse quantization unit 970, an inter inverse quantization unit 910, an inter inverse frequency domain transform unit 920, a residue color compensation unit 930, and a time prediction decoding unit 940, for example.

The entropy decoding unit 900 receives a bitstream and entropy decodes the bitstream. The inverse frequency domain transform coefficient prediction unit 950 then compensates frequency domain coefficients with the entropy decoding data, by using inter-color-component transform. The DC/AC coefficient compensation unit 960 further performs DC/AC coefficient compensation of the compensated frequency domain transform coefficients, and the inverse quantization unit 970 inverse quantizes the DC/AC coefficient compensated data. The inverse frequency domain transform unit 980 then restores an original image by performing frequency domain inverse transform of the inverse quantized data.

In the inter prediction mode, the inter inverse quantization unit 910 inverse quantizes the entropy decoded data, and the inter inverse frequency domain transform unit 920 performs frequency domain inverse transform of the inverse quantized data. By using the relationship between the transform coefficients, the residue color compensation unit 930 can compensate the color component residue coefficients to restore a residue. The time prediction decoding unit 940 may then restore an original image by adding the restored residue and the predicted image.

In differing embodiments of the present invention, the inverse frequency domain transform coefficient prediction unit 950 may be disposed between the DC/AC coefficient prediction unit 960 and the inverse quantization unit 970, or, for example, it may be disposed between the inverse quantization unit 970 and the inverse frequency domain transform unit 980, noting that alternative embodiments are equally available.

For example, the residue color compensation unit 930 may be disposed between the inter inverse quantization unit 910 and the inter inverse frequency domain transform unit 920, or may be disposed before the inter inverse quantization unit 910.

Figure 10:
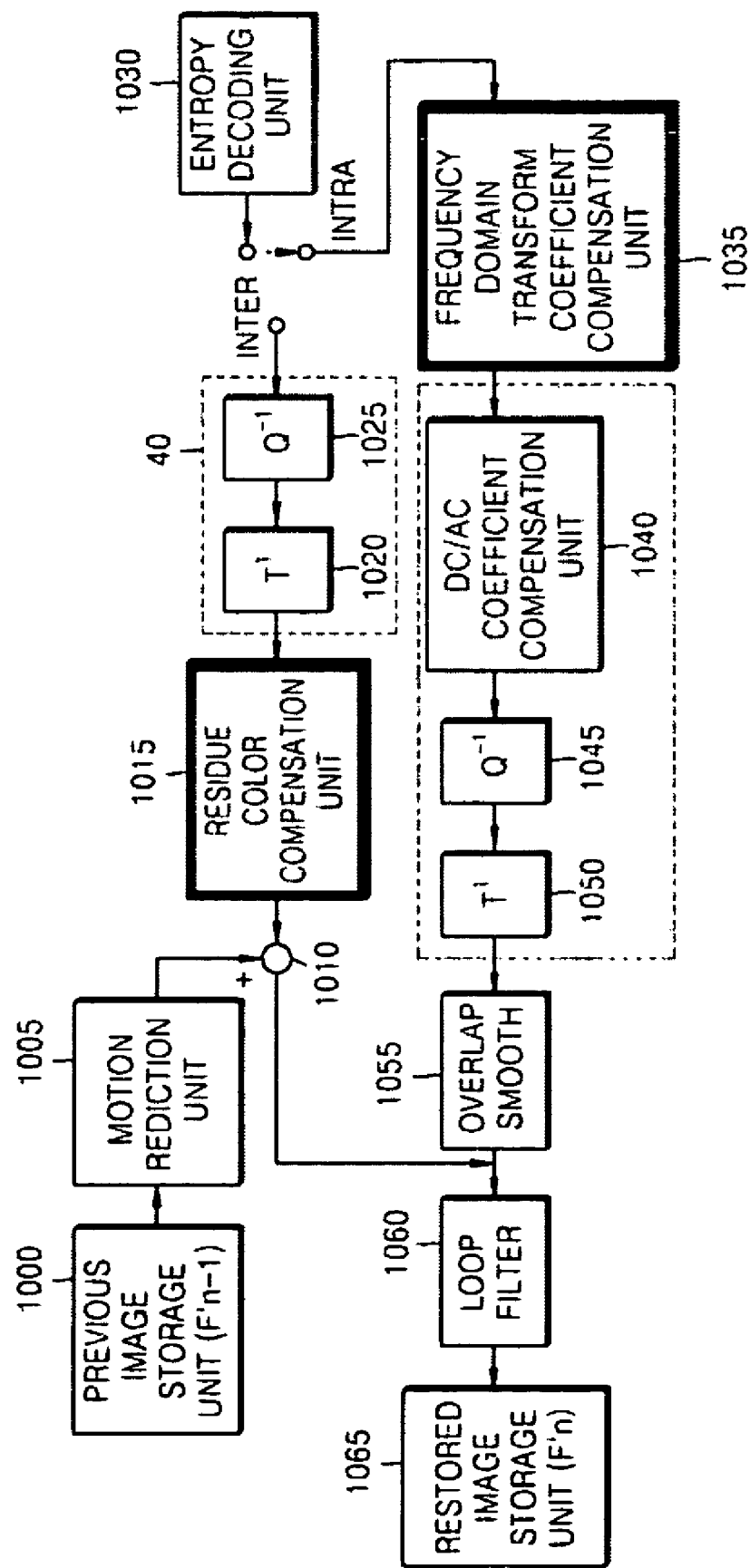
FIG. 10 illustrates a decoding system/apparatus, according to an embodiment of the present invention.

FIG. 10 illustrates a decoding system/apparatus, according to an embodiment of the present invention. This system restores an image from a compressed bitstream through a reverse process of the encoding of FIG. 2, for example.

The decoding system may include an entropy decoding unit 1030, a restored image storage unit (Fn) 1065, a previous image storage unit (F'n-1) 1000, an original image generation unit 1010, an intra inverse compression decoding unit 1, an inter inverse compression decoding unit 3, a loop filter 1060, an overlap smooth unit 1055, a frequency domain transform coefficient compensation unit 1035, a residue color compensation unit 1015, and a motion prediction unit 1005.

The decoding system restores an image from a bitstream, such as a bitstream compressed through the encoding process of FIG. 2, according to an embodiment of the present invention. The compressed data may be entropy decoded in the entropy decoding unit 1030. Then, in the inter prediction mode, first, inverse quantization may be performed in the inverse quantization unit 1025, and through the inverse frequency domain transform unit 1020 and the residue color compensation unit 1015, a restored original image may be generated in the original image generation unit 1010.

Also, in the intra prediction mode, the data passes through the DC/AC coefficient compensation unit 1040, the inverse quantization unit 1045, and the inverse frequency domain transform unit 1050 sequentially, for example. Finally, the loop filter unit 1060 removes a block effect.

Figure 11:
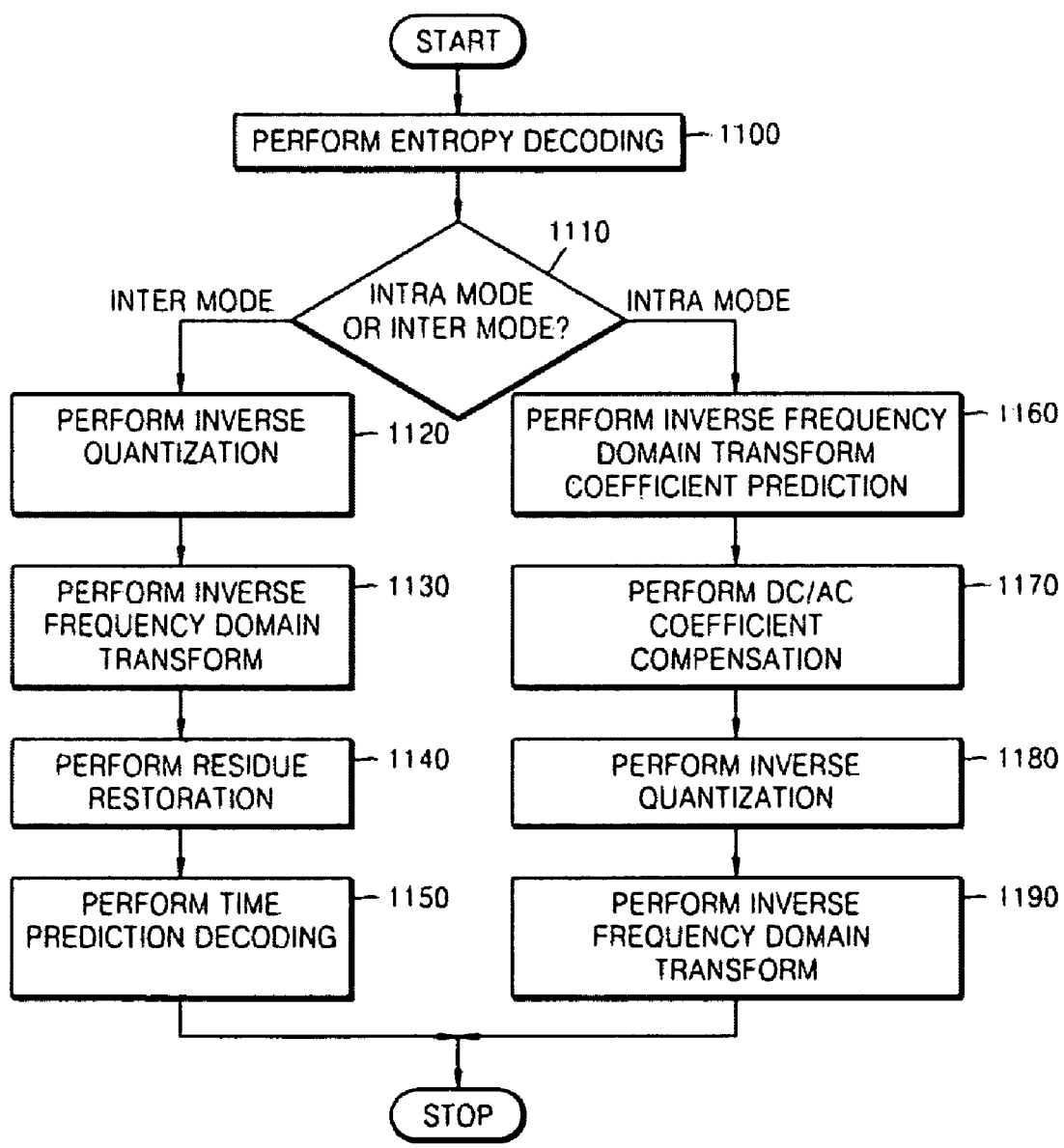
FIG. 11 illustrates a color image and video decoding process of decoding a color image and video encoded by using inter-color-component in the frequency domain, according to an embodiment of the present invention.

FIG. 11 illustrates a color image and video decoding process decoding a color image and video encoded by using inter-color-component, in the frequency domain, according to an embodiment of the present invention. The decoding process may be performed in a reverse order of an aforementioned encoding process, for example. That is, after a bitstream is entropy decoded, if the decoding mode is the intra prediction mode, intra color compensation is performed. If the decoding mode is the inter prediction mode, color residue compensation is performed to restore the residue signal of each color component, and by performing temporal prediction compensation of the residue signal of each component, a restore image may be obtained.

More specifically, first, a bitstream may be input and entropy decoded, in operation 1100. It may then be determined whether the decoding mode is intra prediction mode or inter prediction mode, in operation 1110. If it is the intra prediction mode, frequency domain transform coefficients may be compensated from the entropy decoded data by using inter-color-component transform, in operation 1160. DC/AC coefficient compensation of the compensated frequency domain transform coefficients may then be performed, in operation 1170. The DC/AC coefficient compensated data is inverse quantized, in operation 1180. An original image may then be restored by performing frequency domain inverse transform of the inverse quantized data, in operation 1190.

Figure 12A:
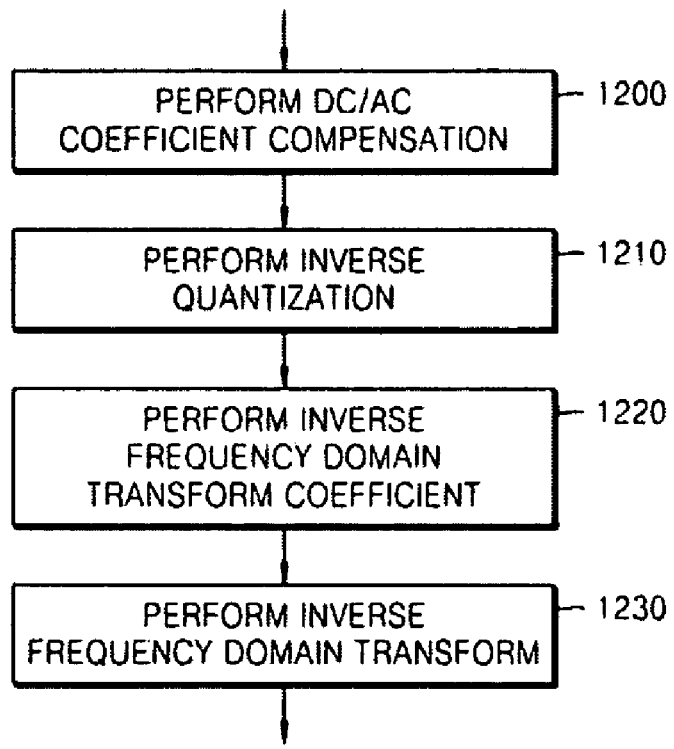
FIGS. 12A and 12B illustrate decoding processes, such as operations 1160 through 1190 of FIG. 11, respectively, but in different orders, according to an embodiment of the present invention.
Figure 12B:
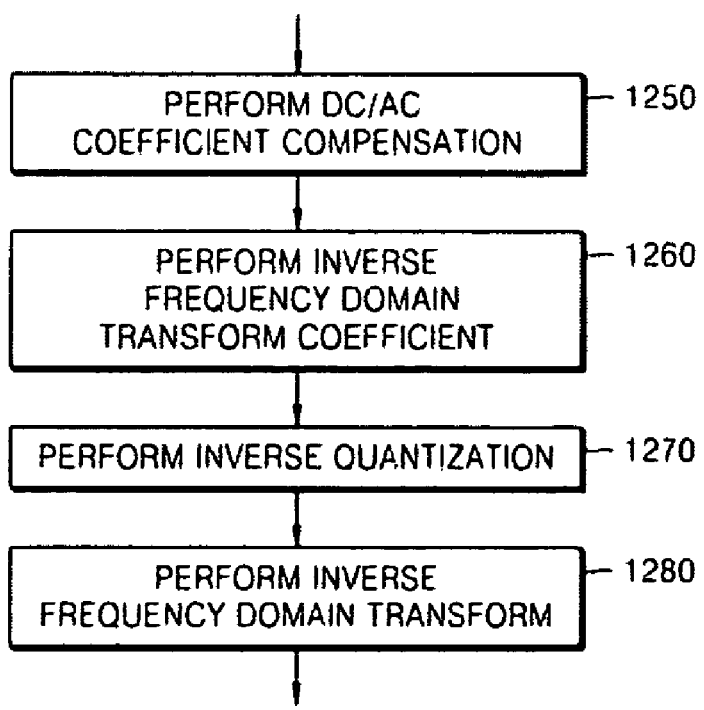

According to an embodiment of the present invention, and example intra prediction decoding process, such as corresponding to the encoding processes of FIG. 3 (operations 350 through 365), and FIGS. 4A and 4B are shown in FIG. 11 (operations 1160 through 1190), and FIGS. 12A and 12B.

Referring to FIG. 12A, DC/AC coefficient compensation of the entropy decoded data may be performed, in operation 1200. The DC/AC coefficient compensated data may then be inverse quantized, in operation 1210. By using inter-color-component transform with the inverse quantized data, frequency domain transform coefficients may be compensated, in operation 1220. An original image may then be restored by performing frequency domain inverse transform of the compensated frequency domain transform coefficients, in operation 1230.

Referring to FIG. 12B, DC/AC coefficient compensation of the entropy decoded data may be performed, in operation 1250. By using inter-color-component transform with the DC/AC coefficient compensated data, frequency domain transform coefficients may then be compensated, in operation 1260. The compensated frequency domain transform coefficients may further be inverse quantized, in operation 1270.

Thereafter, an original image may be restored by performing frequency domain inverse transform of the inverse quantized data, in operation 1280.

Meanwhile, in the inter prediction mode, the entropy decoded data may be inverse quantized, in operation 1120, and frequency domain inverse transform of the inverse quantized data may be performed, in operation 1130. By using the relationship between the transform coefficients with the frequency domain inverse transformed data, the color component residue coefficients may be compensated so that a residue can be restored, in operation 1140. An original image may then be restored by adding the restored residue and the motion prediction image, in operation 1150.

Example encoding processes available in the inter prediction mode, according to an embodiment of the present invention, are shown in FIG. 3 (operations 305 through 320), and FIGS. 5A and 5B.

Figure 13A:
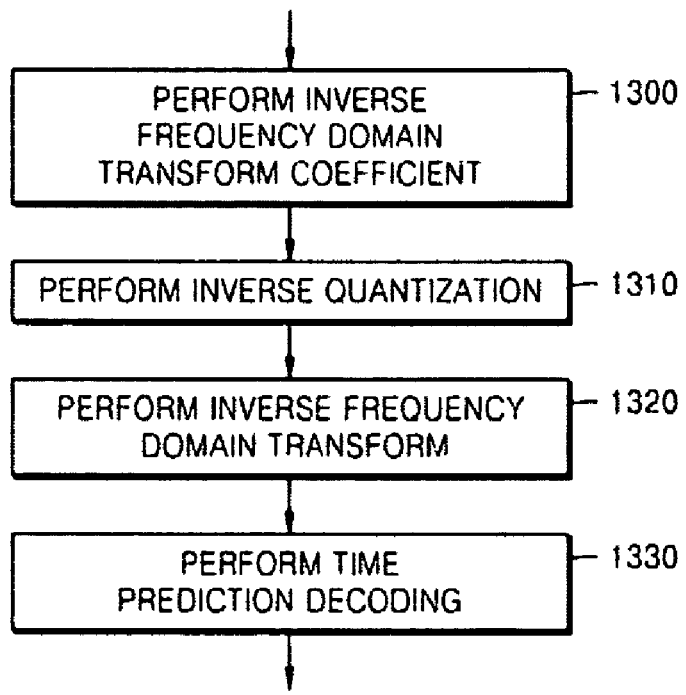
FIGS. 13A and 13B illustrate decoding processes, such as operations 1120 through 1150 of FIG. 11, respectively, but in different orders, according to an embodiment of the present invention.
Figure 13B:
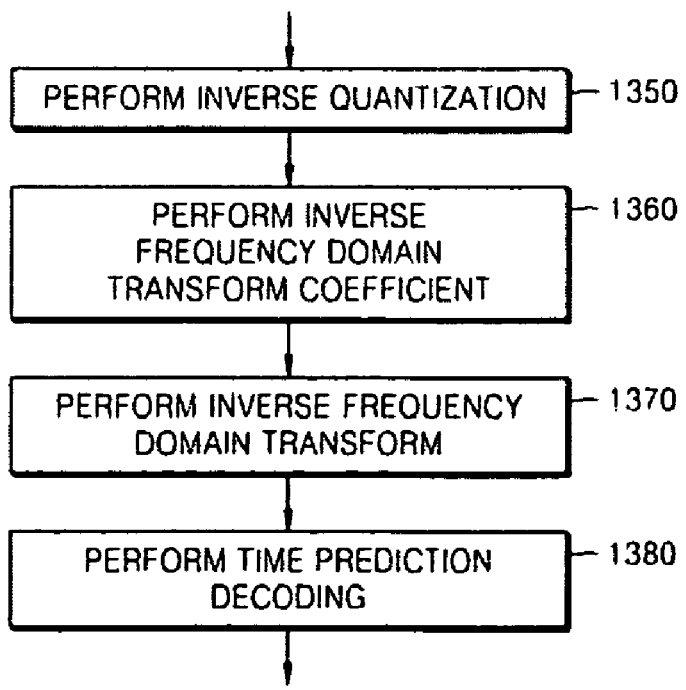

FIG. 11 (operations 1120 through 1150), and FIGS. 13A and 13B further show example decoding processes, e.g., corresponding to the encoding processes, respectively.

Referring to FIG. 13A, in the inter prediction mode, by using the relationship between the transform coefficients with the entropy decoded data, the color component residue coefficients in frequency domain may be compensated, in operation 1300. The compensated color component residue coefficients, in frequency domain, may then be inverse quantized, in operation 1310. By performing frequency domain inverse transform of the inverse quantized color component residue coefficients, a residue may be restored, in operation 1320, and an original image may be restored by adding the restored residue and a motion predicted image, in operation 1330.

Referring to FIG. 13B, in the inter prediction mode, entropy decoded data may be inverse quantized, in operation 1350. By using the relationship between the transform coefficients with the inverse quantized data, the color component residue coefficients in frequency domain may be compensated, in operation 1360. By performing frequency domain inverse transform of the compensated color component residue coefficients in frequency domain, a residue may be restored, in operation 1370, and an original image may be restored by adding the restored residue and a motion predicted image, in operation 1380.

In addition to the above described embodiments, embodiments of the present invention can also be implemented through computer readable code/instructions in/on a medium, e.g., a computer readable medium. The medium can correspond to any tangible medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example. The media may also be a distributed network, so that the computer readable code is stored and executed in a distributed fashion.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The media may also be a distributed network, so that the computer readable code is stored/transferred and executed in a distributed fashion.

In view of at least the above, according to the color image encoding and/or decoding method, medium, and system, a color image or video data can be directly compressed effectively without a conventional color transform process by using inter-color-component prediction in frequency domain.

Furthermore, according to an embodiment, by using the relationship between image components, redundant information between color components varying with respect to the encoding mode may be removed so that the encoding efficiency can be enhanced.

In addition, according to an embodiment, if encoding is directly performed in the color domain of an original image, there may be no loss of image quality, such as color distortion, which occurs when a transform into another domain is performed. Accordingly, the method, medium, and system are appropriate to applications that require high quality image information, such as digital cinema and digital archive.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An encoding method using inter-component prediction in a frequency domain to encode an image having at least two color components, the method comprising:

performing a frequency domain transform of color components of the image, generating frequency domain transform coefficients in the frequency domain;

performing color component transform of the generated frequency domain transform coefficients in the frequency domain based on a relationship between transform coefficients of the color components to remove redundant information between the color components; and entropy encoding, using at least one processing device, resultant redundant information removed data.

2. The method of claim 1, wherein the performing of the frequency domain transform of the color components further comprises:

quantizing the generated frequency domain transform coefficients; and performing DC/AC coefficient prediction of the quantized frequency domain transform coefficients, wherein the performing of the color component transform is performed for a result of the DC/AC coefficient prediction.

3. The method of claim 1, wherein the performing of the frequency domain transform further comprises quantizing the generated frequency domain transform coefficients, and wherein the performing of the color component transform comprises:

performing the color component transform of the generated frequency domain transform coefficients in the frequency domain by using the quantized frequency domain transform coefficients, to remove the redundant information between the color components; and performing DC/AC coefficient prediction of the generated frequency domain transform coefficients after the redundant information has been removed.

4. The method of claim 1, wherein the performing of the color component transform further comprises:

quantizing the frequency domain transform coefficients in which the redundant information has been removed; and performing DC/AC coefficient prediction of the frequency domain transform coefficients after the redundant information has been removed.

5. The method of claim 1, further comprising:

obtaining a prediction image by estimating a motion, in units of blocks of a predetermined size, using a current image and a previous image, and generating residue image data corresponding to a difference between the prediction image and the current image, if an encoding mode is an inter mode; and removing data redundancy between color components of the generated residue image data to generate the resultant redundant information removed data for the entropy encoding of the resultant redundant information removed data.

6. The method of claim 5, further comprising:
transforming the resultant redundant information removed data, into the frequency domain; and
quantizing the frequency domain transformed resultant redundant information removed data,
wherein, in the entropy encoding, the quantized frequency domain transformed resultant redundant information removed data is entropy encoded.

7. The method of claim 5, wherein the removing of the data redundancy between the color components comprises:
transforming the generated residue image data to the frequency domain, generating residue coefficients;
performing color component transform for the residue coefficients to remove redundant information between the color components of the residue image data; and
quantizing the redundant information removed residue image data,
wherein, in the entropy encoding, the quantized redundant information removed residue image data is entropy encoded.

8. The method of claim 5, wherein the removing of the data redundancy between color components comprises:
transforming the generated residue image data to the frequency domain;
quantizing the transformed residue image data to output quantized residue coefficients; and
performing color component transform for the quantized residue coefficients to remove redundant information between the color components of the residue image data,
wherein, in the entropy encoding, a resultant redundant information removed residue image data is entropy encoded.

9. An image and video encoding system using inter-component prediction in a frequency domain in order to encode an image having at least two color components, the system comprising:
a frequency domain transform unit to perform frequency domain transform of color components of the image, generating frequency domain transform coefficients in the frequency domain;
a frequency domain transform coefficient prediction unit to remove redundant information between the color components by performing color component transform of the generated frequency domain transform coefficients based on a relationship between transform coefficients of the color components; and
an entropy encoding unit including at least one processing device to entropy encode a result of the frequency domain transform coefficient prediction unit where the redundant information is removed between transform coefficients.

10. The system of claim 9, further comprising:
a quantization unit to quantize the generated frequency domain transform coefficients; and
a DC/AC coefficient prediction unit to perform DC/AC coefficient prediction of the quantized frequency domain transform coefficients,
wherein, the frequency domain transform coefficient prediction unit performs the color component transform of the frequency domain transform coefficients, based on a result of the DC/AC coefficient prediction unit, to generate the result of the frequency domain transform coefficient prediction unit to be entropy encoded by the entropy encoding unit.

11. The system of claim 9, further comprising:
a residue generation unit to generate residue image data corresponding to a difference between a current image and a prediction image obtained by estimating a motion, in units of blocks of a predetermined size, using the current image and a previous image, if an encoding mode is an inter mode; and
a residue prediction unit to remove data redundancy between the color components of the generated residue image data, and to generate the result of the frequency domain transform coefficient prediction unit to be entropy encoded by the entropy encoding unit.

12. The system of claim 11, further comprising:
an inter frequency domain transform unit to transform resultant redundant information removed residue image data, in which the redundancy is removed in the residue prediction unit, into the frequency domain; and
an inter quantization unit to quantize the transformed redundant information removed data into the frequency domain to generate the result of the frequency domain transform coefficient prediction unit used by the entropy encoding unit.

13. An image and video decoding method using inter-component compensation in a frequency domain in order to decode a bitstream obtained by compressing an original image having at least two color components, by using prediction between frequency domain components, the method comprising:
entropy decoding, using at least one processing device, the bitstream to generate entropy decoded data;
compensating frequency domain transform coefficients from the entropy decoded data by using an inter-color-component transform; and
restoring an image, corresponding to the original image, by performing a frequency domain inverse transform of the compensated frequency domain transform coefficients.

14. The method of claim 13, further comprising:
performing DC/AC coefficient compensation of the compensated frequency domain transform coefficients, as DC/AC coefficient compensated data; and
inverse quantizing the DC/AC coefficient compensated data,
wherein, in the restoring of the image, the image is restored by performing frequency domain inverse transform of the inverse quantized DC/AC coefficient compensated data.

15. The method of claim 13, wherein the compensating of the frequency domain transform coefficients comprises:
performing DC/AC coefficient compensation of the entropy decoded data;
compensating the frequency domain transform coefficients by using an inter-color-component transform using resultant DC/AC coefficient compensated data; and
inverse quantizing the compensated frequency domain transform coefficients, and
restoring the image by performing the frequency domain inverse transform with resultant inverse quantized compensated frequency domain transform coefficients.

16. The method of claim 13, wherein the compensating of the frequency domain transform coefficients comprises:
performing DC/AC coefficient compensation of the entropy decoded data;

inverse quantizing the DC/AC coefficient compensated entropy decoded data; and compensating the frequency domain transform coefficients by using inter-color-component transform based on the inverse quantized DC/AC coefficient compensated entropy decoded data, and restoring the image by performing the frequency domain inverse transform with the compensated frequency domain transform coefficients.

17. The method of claim 13, further comprising:

inverse quantizing the entropy decoded data if a decoding mode is an inter prediction mode;

performing frequency domain inverse transform of the inverse quantized entropy decoded data;

compensating generated component residue coefficients, by using a relationship between the inter-color component transform coefficients, in order to restore residue image data, based on the frequency domain inverse transformed inverse quantized entropy decoded data; and restoring the image by adding the restored residue image data and a motion predicted image.

18. The method of claim 13, further comprising:

inverse quantizing the entropy decoded data if a decoding mode is an inter mode;

compensating component residue coefficients in the frequency domain, based on a relationship between the inter-color component transform coefficients, to restore residue image data based on the inverse quantized entropy decoded data; and restoring the image by adding the restored residue image data and a motion predicted image.

19. The method of claim 13, further comprising:

compensating color component residue coefficients in the frequency domain, based on a relationship between the inter-color component transform coefficients if the decoding mode is an inter mode, with the entropy decoded data;

inverse quantizing the compensated color component residue coefficients in the frequency domain;

restoring residue image data by performing a frequency domain inverse transform of the inverse quantized compensated color component residue coefficients; and restoring the image by adding the restored residue image data and a motion predicted image.

20. A image and video decoding system using inter component compensation in a frequency domain in order to decode a bitstream obtained by compressing an original image having at least two color components, by using prediction between frequency domain components, the system comprising:

an entropy decoding unit including at least one processing device to entropy decode the bitstream to generate entropy decoded data;

an inverse frequency domain transform coefficient prediction unit to compensate frequency domain transform coefficients from the entropy decoded data by using an inter-color component transform; and an inverse frequency domain transform unit to restore an image, corresponding to the original image, by performing a frequency domain inverse transform of the compensated frequency domain transform coefficients.

21. The system of claim 20, further comprising:

a DC/AC coefficient compensation unit to perform DC/AC coefficient compensation of the compensated frequency domain transform coefficients, as DC/AC coefficient compensated data; and an inverse quantization unit to inverse quantize the DC/AC coefficient compensated data, wherein the inverse frequency domain transform unit restores the image by performing a frequency domain inverse transform of the inverse quantized DC/AC coefficient compensated data.

22. The system of claim 20, further comprising:

a residue color compensation unit to compensate color component residue coefficients with respect to the entropy decoded data, by using a relationship of the transform coefficients, in order to restore residue image data, if a decoding mode is an inter mode; and a time prediction decoding unit to restore the image by adding the restored residue image data and a motion predicted image.

23. The system of claim 22, further comprising:

an inter inverse quantization unit to inverse quantize the entropy decoded data, if a decoding mode is an inter mode; and an inter inverse frequency domain transform unit to perform frequency domain inverse transform of the inverse quantized entropy decoded data, wherein the residue color compensation unit compensates the color component residue coefficients, based on the relationship between the inter-color component transform coefficients and frequency domain inverse transformed inverse quantized entropy decoded data, in order to restore the residue image data.

24. At least one computer readable medium comprising computer readable code to control at least one processing device to implement the method of claim 1.

25. At least one computer readable medium comprising computer readable code to control at least one processing device to implement the method of claim 13.

* * * * *